(12) United States Patent
Dontov et al.

(10) Patent No.: US 11,120,133 B2
(45) Date of Patent: Sep. 14, 2021

(54) RANSOMWARE PROTECTION FOR CLOUD STORAGE SYSTEMS

(71) Applicant: Spinbackup Inc., San Francisco, CA (US)

(72) Inventors: Dumitru Dontov, Burlingame, CA (US); Mykola Klymenko, Burlingame, CA (US)

(73) Assignee: Spinbackup Inc., San Francisco, CA (US)

( * ) Notice: Subject to any disclaimer, the term of this patent is extended or adjusted under 35 U.S.C. 154(b) by 373 days.

(21) Appl. No.: 16/183,542

(22) Filed: Nov. 7, 2018

(65) Prior Publication Data

US 2019/0138727 A1  May 9, 2019

Related U.S. Application Data

(60) Provisional application No. 62/582,543, filed on Nov. 7, 2017, provisional application No. 62/772,646, filed on Aug. 24, 2018.

(51) Int. Cl.

| | |
|---|---|
| *G06F 21/00* | (2013.01) |
| *G06F 21/56* | (2013.01) |
| *G06F 21/55* | (2013.01) |
| *H04L 29/08* | (2006.01) |
| *G06F 11/14* | (2006.01) |
| *H04L 29/06* | (2006.01) |

(52) U.S. Cl.
CPC ........ *G06F 21/567* (2013.01); *G06F 11/1464* (2013.01); *G06F 21/554* (2013.01); *G06F 21/561* (2013.01); *G06F 21/565* (2013.01); *G06F 21/568* (2013.01); *H04L 63/00* (2013.01); *H04L 67/1095* (2013.01); *G06F 2221/034* (2013.01); *H04L 67/06* (2013.01); *H04L 67/10* (2013.01)

(58) Field of Classification Search
CPC .. G06F 21/567; G06F 11/1464; G06F 21/554; G06F 21/561; G06F 21/565; G06F 21/568; G06F 2221/034; H04L 63/00; H04L 67/1095; H04L 67/06; H04L 67/10
USPC ........................................................ 726/24
See application file for complete search history.

(56) References Cited

U.S. PATENT DOCUMENTS

| | | | |
|---|---|---|---|
| 6,374,267 B1 * | 4/2002 | Tam | G06F 11/1451 |
| 6,526,418 B1 * | 2/2003 | Midgley | G06F 11/1451 |
| | | | 707/640 |
| 7,315,801 B1 | 1/2008 | Dowd et al. | |
| 7,316,016 B2 | 1/2008 | DiFalco | |
| 7,624,134 B2 * | 11/2009 | Stakutis | G06F 11/1461 |

(Continued)

FOREIGN PATENT DOCUMENTS

WO      2017053745 A1    3/2017

*Primary Examiner* — Josnel Jeudy
(74) *Attorney, Agent, or Firm* — Zeller IP Group, PLLC; Kyle M. Zeller

(57) ABSTRACT

Exemplary security applications and systems are described herein. Such embodiments may be configured to provide backup functionality and ransomware protection for cloud storage systems. The described embodiments may monitor cloud storage systems to detect and classify various events. And the embodiments may perform any number of actions based on classified events, such as transmitting notifications to users, preventing a user or application from accessing the cloud storage system, and/or restoring infected files.

8 Claims, 8 Drawing Sheets

(56) References Cited

U.S. PATENT DOCUMENTS

| | | | |
|---|---|---|---|
| 8,549,643 B1 | 10/2013 | Shou | |
| 9,317,686 B1 | 4/2016 | Ye et al. | |
| 9,756,061 B1 | 9/2017 | Roeh et al. | |
| 10,009,360 B1 | 6/2018 | Todd et al. | |
| 10,121,003 B1 | 11/2018 | Adams | |
| 10,210,330 B1 | 2/2019 | Chen | |
| 10,686,816 B1* | 6/2020 | Shintre | H04L 63/1441 |
| 2006/0020762 A1* | 1/2006 | Urmston | G06F 11/1451 711/162 |
| 2008/0022400 A1 | 1/2008 | Cohen et al. | |
| 2012/0197842 A1* | 8/2012 | Marie | G06F 3/0608 707/639 |
| 2013/0054601 A1 | 2/2013 | Whitlock et al. | |
| 2013/0262638 A1* | 10/2013 | Kumarasamy | H04L 67/34 709/221 |
| 2013/0262801 A1* | 10/2013 | Sancheti | G06F 3/0619 711/162 |
| 2013/0263289 A1* | 10/2013 | Vijayan | G06F 16/128 726/31 |
| 2015/0047032 A1 | 2/2015 | Hannis et al. | |
| 2015/0242478 A1* | 8/2015 | Cantwell | H04L 12/1403 707/634 |
| 2016/0180087 A1 | 6/2016 | Edwards et al. | |
| 2016/0323316 A1 | 11/2016 | Kolton et al. | |
| 2016/0378988 A1 | 12/2016 | Bhashkar et al. | |
| 2017/0091453 A1 | 3/2017 | Cochin | |
| 2017/0140156 A1 | 5/2017 | Gu et al. | |
| 2017/0220427 A1* | 8/2017 | Fu | G06F 3/06 |
| 2017/0223031 A1 | 8/2017 | Gu et al. | |
| 2017/0293529 A1* | 10/2017 | Robison | G06F 3/0619 |
| 2017/0324755 A1 | 11/2017 | Dekel et al. | |
| 2018/0018458 A1* | 1/2018 | Schmugar | G06F 21/6218 |
| 2018/0081548 A1* | 3/2018 | Barzik | G06F 3/067 |
| 2018/0203997 A1 | 7/2018 | Charters et al. | |
| 2018/0293379 A1* | 10/2018 | Dahan | G06F 21/566 |
| 2019/0108340 A1* | 4/2019 | Bedhapudi | G06F 16/1734 |
| 2020/0125660 A1* | 4/2020 | Shuma | G06F 16/2272 |
| 2020/0153854 A1* | 5/2020 | Mcqueen | G06F 21/316 |
| 2020/0387609 A1* | 12/2020 | Hansen | G06F 21/565 |

* cited by examiner

Cloud Applications Audit

800

Scan Date: Dec 9, 2016 — 805   [Scan Now 815]

Connected Cloud Applications — 810

| | | |
|---|---|---|
| Trusted Applications | 820 | 60 |
| Risky Applications | 830 | 40 |
| Total | 840 | 100 |

FIG. 8

RANSOMWARE PROTECTION FOR CLOUD STORAGE SYSTEMS

CROSS-REFERENCE TO RELATED APPLICATIONS

The present application claims benefit of U.S. provisional patent application Ser. No. 62/582,543, titled "Ransomware Protection for Cloud Storage Systems," filed Nov. 7, 2017, and U.S. provisional patent application Ser. No. 62/722,646, titled "Ransomware Protection for Cloud Storage Systems," filed Aug. 24, 2018, which is incorporated by reference herein in its entirety.

BACKGROUND

This specification relates generally to systems and methods for providing antivirus protection. More specifically, this specification relates to systems and methods for providing ransomware protection for cloud storage systems.

Ransomware is considered a dominating threat in the security world. Ransomware attacks increased by nearly 250% from 2016 to 2017, and global damages from such attacks exceeded five billion dollars in 2017. Currently, a new company is hit with a ransomware attack about every 40 seconds.

Surprisingly, it appears that hackers behind ransomware attacks have no preference in the size of their victims. While many large private and government organizations experienced ransomware attacks in 2017—especially the so-called "WannaCry" virus-75% of infected organizations had less than 1,000 employees. Every year, such attacks affect hundreds of small- and medium-sized corporations, nonprofits and educational organizations throughout the world.

FIG. 1 shows a typical ransomware attack process. At step 101, a ransomware application is installed on a user's computer. While a user may intentionally install ransomware, this is not usually the case. Rather, a user, such as employee of a company or a student of an educational organization, may unintentionally open a phishing link or attachment (e.g., a word processing file with noxious macros) contained in an email or displayed on a website. In other instances, a user may connect a remote drive (e.g., a USB drive) that is infected with a ransomware program. Such ransomware programs may be automatically transferred to the user's computer and a ransomware application may be automatically installed and executed. In both cases, if user's computer is connected to an intranet network, the ransomware application may spread throughout the whole system via exploits. Such applications may target other computers connected to the network, even if users of such computers have not opened ransomware programs.

At step 102, some or all of the user's locally stored files may be encrypted by the ransomware application. For example, files of all major extensions (including text files, audio files, image files, and video files) that are stored on all local disks may be encrypted.

Unfortunately, any number of locally stored files may be associated with a cloud storage system, such as GOOGLE DRIVE, DROPBOX, MICROSOFT ONEDRIVE, etc. For example, the user's computer may store files that are set to automatically sync with GOOGLE DRIVE via an installed syncing application such GOOGLE BACKUP & SYNC or GOOGLE FILE STREAM. As another example, the MICROSOFT OFFICE 365 application may automatically sync locally stored files to MICROSOFT OFFICE. Accordingly, at step 103, the encrypted local files are synced to the cloud storage system. In this way, the ransomware affects a user's local files, the user's cloud storage system files and/or any files that are shared with the user via the cloud storage system (e.g., files owned by other users of the cloud storage system).

It will be appreciated that encrypted files may be treated the same by cloud syncing applications as files that have been intentionally modified by a user. A syncing application works in the background and uploads new and modified files to the cloud storage system, automatically and quickly. So the syncing application syncs locally stored, encrypted files ("infected files") to the cloud storage system in the same way as when a user edits a document. Within a few seconds or minutes, all files stored in the cloud storage system may be replaced with corresponding infected files. Unfortunately, this often results in the user not being able to access, view or restore previous versions of infected files.

After malicious ransomware activities a new stage directed to diminish the consequences of the attack may begin. Typically an admin user or cloud storage system provider has two, unfavorable choices—recover the infected files from a third-party backup provider (requiring a tremendous amount of time), or pay a ransom and hope the ransomware application owner provides a decryption key.

Unfortunately, conventional antivirus software is not effective at preventing ransomware attacks. With every new type of ransomware application, the underlying encryption method is changed, so an antivirus software that is effective against one type of ransomware will not protect against another type of ransomware until it is updated. Moreover, existing antivirus and antimalware solutions protect only local devices against ransomware by providing manual solutions to identify and recover from ransomware attacks. Currently no solution exists that protects data stored in a cloud storage system against ransomware attacks.

Accordingly, there is a need for systems and methods that are adapted to detect ransomware applications, block such applications from accessing a cloud storage system, and restore files infected by ransomware applications quickly and with minimal or no loss of information. It would be beneficial if such systems and methods automatically created protected backups of files at regular, predetermined time intervals to facilitate the restoration of infected files to a recent, non-infected state. It would be further beneficial if such systems and methods could monitor various cloud applications connected to a cloud storage system and provide notifications to users relating to cloud storage system events.

SUMMARY

In accordance with the foregoing objectives and others, exemplary applications, methods and systems are disclosed herein to provide ransomware protection for cloud storage systems. The disclosed embodiments may automatically create backups of files stored in one or more cloud storage systems at predetermined time intervals, allow for timely identification of ransomware applications running on a device, block such ransomware from accessing cloud storage systems, and quickly restore files infected by ransomware with minimal or no loss of important information. The embodiments may additionally monitor cloud storage systems and cloud applications that access such systems in order to detect, classify and notify users of various events.

In one embodiment, a security system is provided. The security system may include a cloud storage system storing a plurality of files and a server in communication with the cloud storage system via a network. During a first time period, the server may receive file information for each of the plurality of files stored in the cloud storage system; and generate and store a backup file corresponding to each of the plurality of files stored in the cloud storage system. During a second time period, the server may receive modified file information for each of a subset of files selected from the plurality of files; and determine, based on the received modified file information, that a plurality of events have occurred during the second time period. Each of the determined events may be associated with a modified file selected from the subset of files; a file modification activity performed on the modified file; a time the file modification activity was performed; and a source of the file modification activity. Accordingly, the server may determine that the plurality of events exceeds a predetermined event frequency threshold; determine that one of the modified files is an infected file based on the modified file information associated therewith; and/or replace the infected file in the cloud storage system with the corresponding stored backup file.

In another embodiment, a method of providing ransomware protection for a cloud security system is provided. The method may include receiving, by a security system, during a first time period, file information for each of a plurality of files stored in a cloud storage system; and generating and storing a backup file corresponding to each of the plurality of files stored in the cloud storage system. The method may further include receiving, by the security system, during a second time period, modified file information for each of a subset of files selected from the plurality of files stored in the cloud storage system; and determining, by the security system, based on the received modified file information, that a plurality of events have occurred during the second time period. Generally, each of the plurality of events may be associated with event information, such as a modified file selected from the subset of files, a file modification activity performed on the modified file, a time the file modification activity was performed, and/or a source of the file modification activity. The method may also include determining, by the security system, an individual event risk score for each of the events; calculating, by the security system, an aggregate risk score for the plurality of events based on the individual event risk scores; classifying, by the security system, the plurality of events as a ransomware attack, based on the aggregate risk score; and/or performing, by the security system, an action based on the ransomware attack classification.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 8 shows an exemplary cloud applications audit screen 800 of a security application according to an embodiment.

DETAILED DESCRIPTION

Various systems, methods and applications are disclosed herein to provide cloud storage system monitoring and protection. The disclosed embodiments may communicate with one or more cloud storage systems in order to create and store backups of files located within such systems. The embodiments may continually monitor cloud storage systems in order to automatically detect and/or categorize various security events. In some cases, the disclosed embodiments may provide notification functionality to alert users about security events and/or file restoration functionality to allow for infected files stored in a cloud storage system to be automatically restored to a previous, non-infected version.

In one embodiment, a security application is provided. The security application may be in communication with a cloud storage system, such that the application may transmit/receive information to/from the cloud storage system. The security application may receive file information relating to files stored in the cloud storage system in order to create and store backups of the files. Such backups may be automatically generated by the security application at predetermined time intervals. Additionally or alternatively, the security application may allow a user to manually generate backups of one or more of the files, as desired or required.

The security application may employ received file information to determine that a security event has occurred. For example, the security application may compare received file information to any number of predetermined parameters in order to identify a given security event. As another example, the security application may apply machine learning and/or other algorithms to received file information in order to detect, score and/or classify security events.

The security application may be adapted to perform various actions upon determining that a security event (or a specific type of security event) has occurred. For example, the application may display or transmit security event notifications to one or more users (e.g., based on notification preferences). As another example, the security application may prevent one or more users and/or cloud applications from accessing a cloud storage system. And, as yet another example, the application may automatically restore infected files to a previous, non-infected version (e.g., from a backup of such files).

Figure 1:
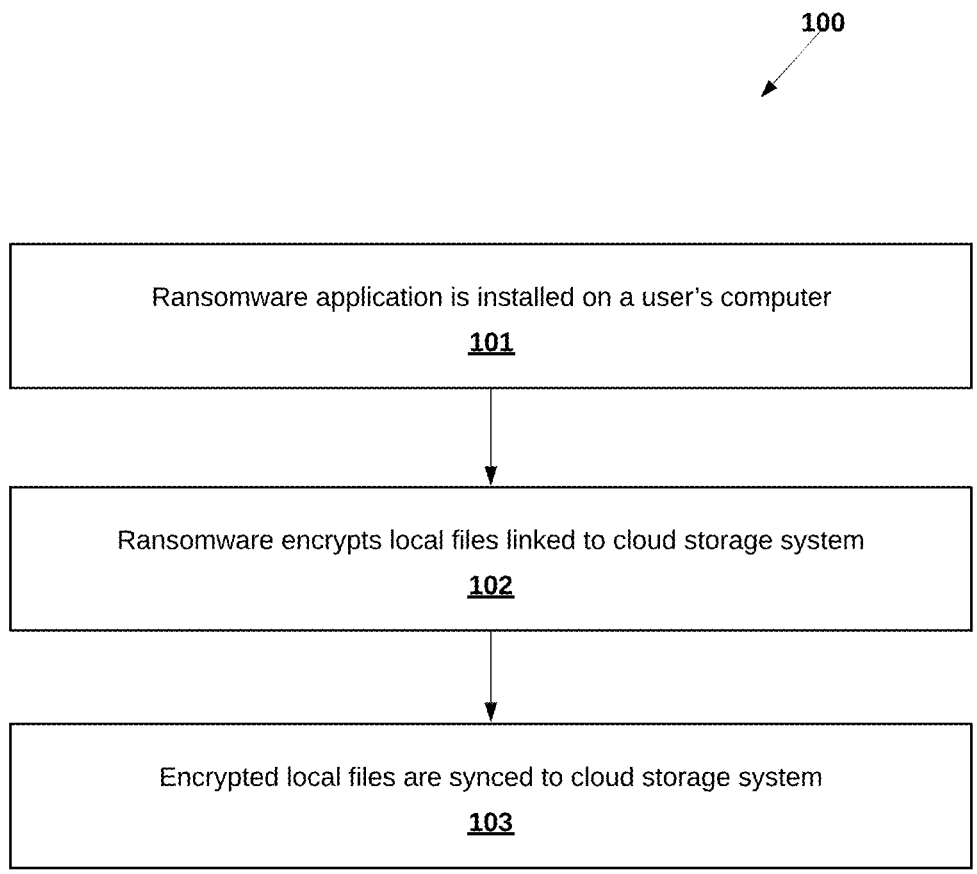
FIG. 1 shows a typical ransomware attack process 100.
Figure 2:
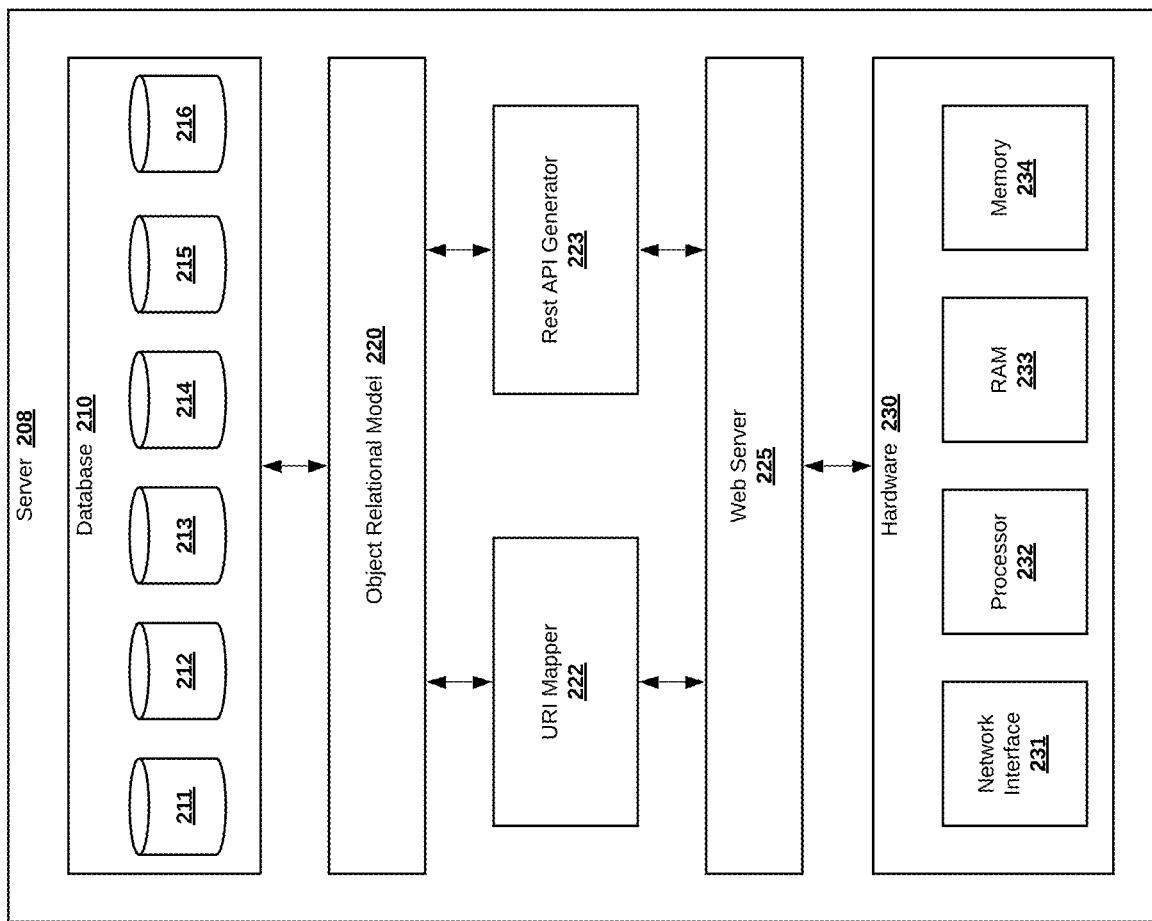
FIG. 2 shows an exemplary security system 200 according to an embodiment.
Figure 2:
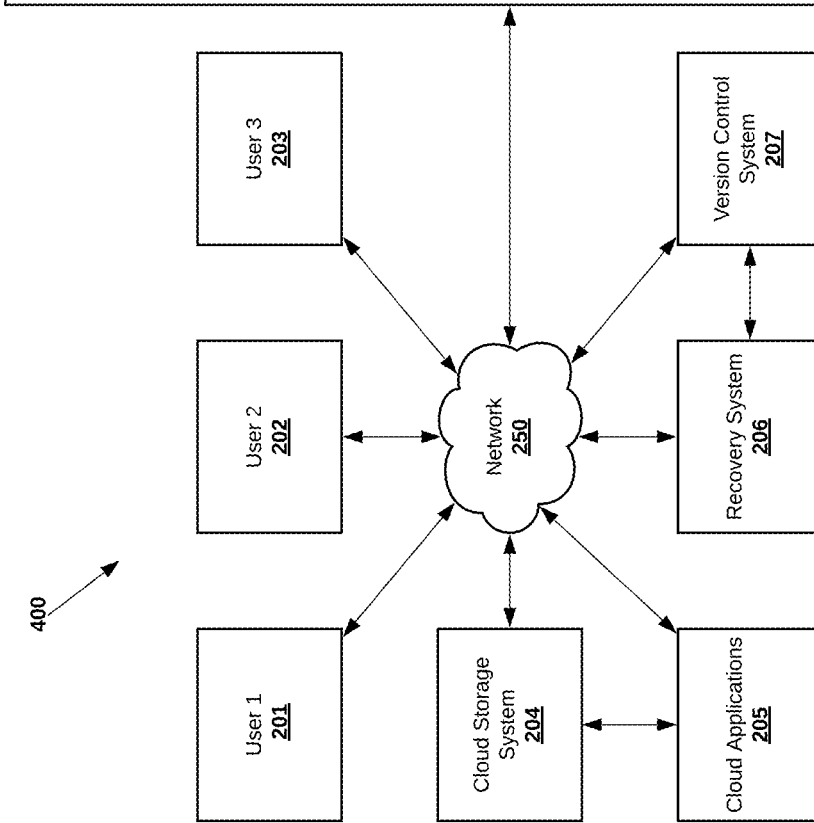

Referring to FIG. 2, an exemplary security system 200 according to an embodiment is illustrated. As shown, the system 200 comprises any number of users 201, 202, and 203 accessing a server 208 via a communications network 250. Non-limiting examples of communication networks include a local area network ("LAN") and a wide area network ("WAN"), e.g., the Internet.

In one embodiment, the system 200 may be entirely or partially implemented on one or more servers 208 comprising hardware 230, such as any number of processors 232, random access memory ("RAM") 232 and internal or external memory 234. The server 208 may include a network interface 231 such that it may access a network 250 to send or receive information.

As shown, the server 208 may be in communication with one or more cloud storage systems 204, for example, via the network 250. As used herein, a cloud storage system refers to any system that stores data in remote servers that may be accessed over a network. Exemplary cloud storage systems 204 include, but are not limited to, GOOGLE DRIVE, MICROSOFT ONEDRIVE, DROPBOX, ICLOUD, NEXTCLOUD, BOX, SPIDEROAK, APPLE ICLOUD, SUGARSYNC, and many others.

In some embodiments, a cloud storage system 204 may be connected to any number of cloud applications 205. As used herein, a cloud application refers to any system, application, extension, add-on, script, or other computer program that communicates with a given cloud storage system over a network. Exemplary cloud applications may include, but are not limited to, email applications, calendar applications, contacts applications, document and webpage creation applications, messaging applications and many others As an example, a cloud storage system 204 may be in communication with any number of third-party cloud applications 205 (e.g., LUCID CHARTS, ZAPIER, ULTRADOX, EDITEY, ASANA, etc.) that may access the cloud storage system. As another example, the server 208 may be in communication with a cloud software suite (e.g., GOOGLE GSUITE) that includes a cloud storage system 204 and any number of additional first-party cloud applications 205 (e.g., GOOGLE DOCS, GOOGLE CALENDAR, GOOGLE HANGOUTS, GOOGLE GMAIL, GOOGLE SITES, etc.) that may access the cloud storage system.

Generally, the server 208 may transmit/receive various information to/from the cloud storage systems 204 and any cloud applications 205 connected thereto. It will be appreciated that the server 208 may be in direct communication with a cloud storage system 204 (e.g., via the network 250) and in indirect communication with any cloud applications 205 connected to the cloud storage system. Alternatively, the server may be in direct communication with a cloud storage system 204 and any cloud applications 205 connected thereto.

As shown, the server 208 may be in communication with at least one database 210, such that server may store various information in the database and access the same to retrieve the information. For example, the server 208 may transmit/retrieve some or all of the following information to/from the database 210: information received from one or more cloud storage systems, information received from one or more cloud applications, information received from one or more users and/or information determined by the system. Although shown as internal to the server 208, it will be appreciated that the database 210 may be accessed by the server 208 over a network 250 or via another wired or wireless connection.

In one embodiment, the database 210 may include a number of tables 211-216, each adapted to store certain information. Exemplary tables may include, but are not limited to, a users table 211, an applications table 212, a files table 213, an events table 214, a parameters table 215, and a notifications table 216.

A users table 211 may store user information relating to any number of users of the security system. Exemplary user information may include, but is not limited to: a unique user ID, a username, a password, a name, an email address, a phone number, a mailing address, billing information (e.g., billing address, credit card number, bank account, etc.), a team or organization with which the user is associated, location information (e.g., a known geographic location, an associated user device, an associated IP address, an associated domain, an associated IP address, etc.), a user type (e.g., admin, registered, guest, etc.), and/or notifications settings information (e.g., types of notifications that may be sent, dates and/or times notifications may be sent, events for which notifications should be sent, etc.). As discussed in detail below, user information may also include user risk information, such as a user risk score, which may be determined based on any of the other user information.

An applications table 212 may store application information relating to each cloud storage system associated with the security system and any cloud applications connected thereto. In one embodiment, application information may include an application name, an application type, an application description, an application developer, an application location (e.g., URL, IP address, network, etc.), an installation or connection date, a version, a last-updated date, permissions information, and/or security information.

Generally, permissions information relates to the files that may be accessed by a cloud application and the activities that it may take with respect to such files. For example, permission information may include a list of cloud storage system files that may be accessed by a cloud application and, for each file, whether the application can read, modify, edit, copy, move, and/or delete the file.

With respect to security information, the system may receive and/or determine any of the following for a given cloud application: what information is exchanged between the cloud application and the cloud storage system; whether such information is encrypted during transit; what received information is stored by the cloud application; whether stored information is encrypted; how the cloud application uses or shares received information; whether received information is (or can be) deleted upon request; security breach history; and/or security testing practices relating to the cloud application.

As discussed below, application information may also include application risk information, such as an application risk score. An application risk score may be determined based on permissions information, security information and/or any other application information associated with a given cloud application.

The files table 213 may store file information relating to any number of files associated with a cloud storage system. Exemplary file information may include: a file name, a file type, a file description, file metadata, file content, a file location, a file size, a creation date, a last-modified date, a last-opened date, sharing status (e.g., users with whom a file is shared, privileges of such users, date when such sharing occurred, users with whom a sharing user has shared the file, etc.), sensitivity information, and/or an infection status.

With respect to sensitivity information, each file may be classified as "sensitive" or "not sensitive" based on the file's contents. For example, a file may be classified as "sensitive" (i.e., a "sensitive file") when it contains personally identifiable information (e.g., social security numbers, driver's license information, etc.), financial information (e.g., credit card numbers, bank accounts, etc.), Health Insurance Portability and Accountability Act ("HIPAA") information or other medical information, confidential company information, or any other information considered to be sensitive. In one embodiment, the system may receive a sensitivity status from a user or a connected system. In other embodiments, the system may employ natural language processing or other means to determine the contents of a file, calculate a sensitivity score based on such contents, and then determine a sensitivity status of the file, based on the calculated score.

The system may also receive or determine an infection status for any number of files stored in a cloud storage system. Generally, infection status relates to whether a given file has been subject to a ransomware attack and infection status may be determined based on any file information associated with a file. In one embodiment, the system may determine infection status based on, for example, whether or not the file: is encrypted, contains malicious code replication, has been overwritten, and/or has been moved to a non-typical location.

As discussed below, file information may also include file risk information, such as a file risk score. Such information may be determined based on sensitivity information, infection status and/or any other file information associated with a given file.

In one embodiment, the database may comprise an events table 214 that stores event information relating to any number of system-determined events. Generally, an event may be described as an activity performed on a system (i.e., a target system) and/or one or more files stored on such systems (i.e., target files), wherein the activity is performed by a user or cloud application (i.e., a source) from a particular location (i.e., source location) and at a particular time. Accordingly, the security system may determine and record some or all of the following event information for each event: activity details relating to an activity (e.g., activity type); application information relating to the target system (e.g., a cloud storage system); file information relating to the target files; user information or application information relating to the source; location information relating to the source's location (e.g., URL, IP address, user device, browser, geographic location, etc.) and time information relating to a date and time when the activity was performed by the source.

Exemplary activities may include, but are not limited to: logging into or out of a system/application; navigating to a particular screen of a system/application; adding, removing or editing a user of a system/application; connecting or disconnecting a cloud storage system to/from the security application; connecting or disconnecting a cloud application to/from a cloud storage system; accessing a file; reading a file; opening a file; closing a file; modifying contents of a file; moving a file; renaming a file; deleting a file; sharing a file; editing privileges relating to a file; transferring a file; downloading a file; copying a file; backing up a file; restoring a file; renaming a file; encrypting a file; and/or decrypting a file.

As an example, a file move event may be associated with: a move activity, a file, an original location of the file in the cloud storage system, an updated location of the file in the cloud storage system, a date/time the move occurred, a user who performed the move and a user device employed by the user to move the file. As another example, a share file event may be associated with a share activity, a file in a cloud storage system, an original user (or group of users) who had access to the file, an updated user (or group of users) who was granted access to the file, a date/time the share occurred, a source cloud application that caused the file to be shared, and an IP address associated with the source cloud application.

As discussed below, event information may also include event risk information, such as an aggregate event risk score. Such information may be determined based on risk information associated with each of the components that make up a given event (e.g., activity, target file, source, location, and/or time).

In certain embodiments, the database may include a risk parameters table 215 that stores any number of parameters that may be employed by the system to score and/or classify files, cloud applications, users, activities and/or events (including ransomware attacks) with respect to risk. Generally, risk parameters may relate to any of the above described user information, application information, file information, and/or event information. Exemplary parameters worth mention may relate to one or more of: application permissions information, application security information, file sensitivity information, file information changes (e.g., changes to a file's name, encryption status, content, format, extension and/or metadata), event activity type (e.g., file renames, file modifications, file deletions); and/or event frequency (e.g., a number of events associated with a particular activity that occur within a given amount of time). The parameters table 215 may also incorporate up-to-date information regarding various ransomware applications (e.g., ransomware definitions) in order to detect ransomware attack events.

Finally, a notifications table 216 may store notification information relating to various alerts and/or notifications to be transmitted to users. Exemplary notification information may comprise: a notification type, notification content, a notification status (e.g., permitted, restricted, sent, received, queued, not sent, etc.), a transmission time, a triggering event, a minimum classification required for the triggering event, one or more recipients, and/or contact information for each of the recipients.

As shown, the database 210 may be in communication with an object relational mapping ("ORM") 220, also known as an object relational model or object-relational database management system. Although shown as internal to the server, it will be appreciated that the ORM 220 may be accessed by the server over the network or via physical connection.

The ORM 220 may be in communication with one or more of the following: a Universal Resource Indicator (URI) mapper 222, and a Rest API generator 223. First, the URI mapper 222 may map a URI into a pointer to an internal program, view, logic, or presentation of data within the system, based on one or more rules of a matching object specified in a collection of mapping objects. The matching object may be a regular expression. The URI mapper 222 may be in communication with a web server 225.

The Rest API generator 223 may be in communication with a web server 225 as to send and/or receive data to/from client devices communicating with the server using HTTP and/or HTTPS. The Rest API generator 223 may prepare data stored in the database for delivery to a client device or may prepare data received from a client device for storage in the database. The Rest API may be capable of translating between formats including, but not limited to JSON, XML, CSV, and the like. The Rest API may be capable of automatically generating URIs based upon data structures observed in the ORM for access by client devices.

A web server 225 may be adapted to deliver web pages on request to users using the Hypertext Transfer Protocol (HTTP and/or HTTPS) or similar protocols. This allows for delivery of HTML documents and any additional content that may be included by a document, such as images, style sheets and scripts.

A user or client device may employ a web browser or similar client application to engage in communication with a web server. For example, a client application may make a request for a specific resource using HTTP/HTTPS and the web server 225 may respond with the content of that resource or an error message if unable to do so. The resource may be data or a file stored in a database 210. The web server 225 can receive content from a user, possibly using HTTP/HTTPS.

In certain embodiments, a user (201, 202, or 203) may access the server 208 (i.e., an application running on the server) through a user device connected to a network 250. A user device may be any device capable of accessing the server, such as by running a client application or other software like a web browser or web-browser-like application. In one embodiment, a user device may comprise, for example, an input/output device, a display, a processor, memory, and/or audio equipment, such that the user may utilize the user device to interact with a security application and/or a cloud storage system. Exemplary user devices include, but are not limited to, general purpose computers, laptops, tablets, smartphones, wearable devices, personal digital assistants, televisions, tablets, and the like.

An exemplary security application may comprise HTML data, images, icons, and/or executable code. The executable code may be composed in Java, JavaScript, ECMAscript, coffeescript, python, Ruby or other programming languages suitable for execution within the security application, or translation into a client application executable form.

It will be apparent to one of ordinary skill in the art that, in certain embodiments, any of the functionality of the user device may be incorporated into the server, and vice versa. Likewise, any functionality of a native security application may be incorporated into a browser-based security application, and such embodiments are intended to be fully within the scope of the invention.

In one embodiment, communications of data among the server 208, a user device (201, 202, 203), cloud storage system 204 and/or a cloud application 205 may involve the use of a translation and/or serialization module. A serialization module can convert an object from an in-memory representation to a serialized representation suitable for transmission via HTTP or another transport mechanism. For example, the serialization module may convert data from a native Python, Ruby, or Java in-memory representation into a JSON string for communication over the client-to-server transport protocol.

Similarly, communications of data among the server 208 and a user device (201, 202, 203), cloud storage system 204 and/or a cloud application 205 may be continuous and automatic, or may be user-triggered. For example, the user may click a button, causing a security application and/or client device to send data to the server. Alternately, a security application may automatically send updates to the server 208 periodically without prompting by a user. If a system sends data autonomously, the server may be configured to transmit this data, either automatically or on request, to additional systems and/or applications.

In one embodiment, the server 208 may be connected to one or more external systems via the network 250. External systems may store information in one or more databases that may be accessed by the antivirus system. External systems may include, but are not limited to, backup and recovery systems 206 and/or version control system 207, which may be connected to each other.

The server 208 may be capable of populating database tables, with or without user interaction, by communicating with external systems. The server may also be capable of communicating user-populated and/or automatically-populated database table entries to external systems. In both cases, the server may notify users of such communications.

Generally, embodiments of the subject matter and the functional operations described in this specification can be implemented in one or more of the following: digital electronic circuitry; tangibly-embodied computer software or firmware; computer hardware, including the structures disclosed in this specification and their structural equivalents; and combinations thereof. Such embodiments can be implemented as one or more modules of computer program instructions encoded on a tangible non-transitory program carrier for execution by, or to control the operation of, data processing apparatus (i.e., one or more computer programs). Program instructions may be, alternatively or additionally, encoded on an artificially generated propagated signal (e.g., a machine-generated electrical, optical, or electromagnetic signal) that is generated to encode information for transmission to suitable receiver apparatus for execution by a data processing apparatus. And the computer storage medium can be one or more of: a machine-readable storage device, a machine-readable storage substrate, a random or serial access memory device, and combinations thereof.

As used herein, the term "data processing apparatus" comprises all kinds of apparatuses, devices, and machines for processing data, including but not limited to, a programmable processor, a computer, and/or multiple processors or computers. Exemplary apparatuses may include special purpose logic circuitry, such as a field programmable gate array ("FPGA") and/or an application specific integrated circuit ("ASIC"). In addition to hardware, exemplary apparatuses may comprise code that creates an execution environment for the computer program (e.g., code that constitutes one or more of: processor firmware, a protocol stack, a database management system, an operating system, and a combination thereof).

The term "computer program" may also be referred to or described herein as a "program," "software," a "software application," a "module," a "software module," a "script," or simply as "code." A computer program may be written in any form of programming language, including compiled or interpreted languages, or declarative or procedural languages, and it can be deployed in any form, including as a standalone program or as a module, component, subroutine, or other unit suitable for use in a computing environment. Such software may correspond to a file in a file system. A program can be stored in a portion of a file that holds other programs or data. For example, a program may include one or more scripts stored in a markup language document; in a single file dedicated to the program in question; or in multiple coordinated files (e.g., files that store one or more modules, sub programs, or portions of code). A computer program can be deployed and/or executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as but not limited to an FPGA and/or an ASIC.

Computers suitable for the execution of the one or more computer programs include, but are not limited to, general purpose microprocessors, special purpose microprocessors, and/or any other kind of central processing unit ("CPU"). Generally, CPU will receive instructions and data from read only memory ("ROM") and/or RAM. The essential elements of a computer are a CPU for performing or executing instructions and one or more memory devices for storing instructions and data. Generally, a computer will also include, or be operatively coupled to receive data from or transfer data to, or both, one or more mass storage devices for storing data (e.g., magnetic, magneto optical disks, and/or optical disks). However, a computer need not have such devices. Moreover, a computer may be embedded in another device, such as but not limited to, a mobile telephone, a personal digital assistant ("PDA"), a mobile audio or video player, a game console, a Global Positioning System ("GPS") receiver, or a portable storage device (e.g., a universal serial bus ("USB") flash drive).

Computer readable media suitable for storing computer program instructions and data include all forms of nonvolatile memory, media and memory devices. For example, computer readable media may include one or more of the following: semiconductor memory devices, such as erasable programmable read-only memory ("EPROM"), electrically erasable programmable read-only memory ("EEPROM") and/or and flash memory devices; magnetic disks, such as internal hard disks or removable disks; magneto optical disks; and/or CD ROM and DVD-ROM disks. The processor and the memory can be supplemented by, or incorporated in, special purpose logic circuitry.

To provide for interaction with a user, embodiments may be implemented on a computer having any type of display device for displaying information to a user. Exemplary display devices include, but are not limited to one or more of: projectors, cathode ray tube ("CRT") monitors, liquid crystal displays ("LCD"), light-emitting diode ("LED") monitors and/or organic light-emitting diode ("OLED") monitors. The computer may further comprise one or more input devices by which the user can provide input to the computer. Input devices may comprise one or more of: keyboards, a pointing device (e.g., a mouse or a trackball). Input from the user can be received in any form, including acoustic, speech, or tactile input. Moreover, feedback may be provided to the user via any form of sensory feedback (e.g., visual feedback, auditory feedback, or tactile feedback). A computer can interact with a user by sending documents to and receiving documents from a device that is used by the user (e.g., by sending web pages to a web browser on a user's client device in response to requests received from the web browser).

Embodiments of the subject matter described in this specification can be implemented in a computing system that includes one or more of the following components: a backend component (e.g., a server); a middleware component (e.g., an application server); a frontend component (e.g., a user device having a graphical user interface ("GUI") and/or a web browser through which a user can interact with an implementation of the subject matter described in this specification); and/or combinations thereof. The components of the system can be interconnected by any form or medium of digital data communication, such as but not limited to, a communication network.

The computing system may include clients and/or servers. The client and server may be remote from each other and interact through a communication network. The relationship of client and server arises by virtue of computer programs running on the respective computers and having a client-server relationship to each other.

It will be appreciated that any other suitable software or hardware or combinations thereof may be used with the exemplary antivirus systems and applications disclosed herein. Moreover, such applications may be implemented at any suitable location in FIG. 2, such as but not limited to at the server, an external system, at the user access device or at a location not pictured.

Figure 3:
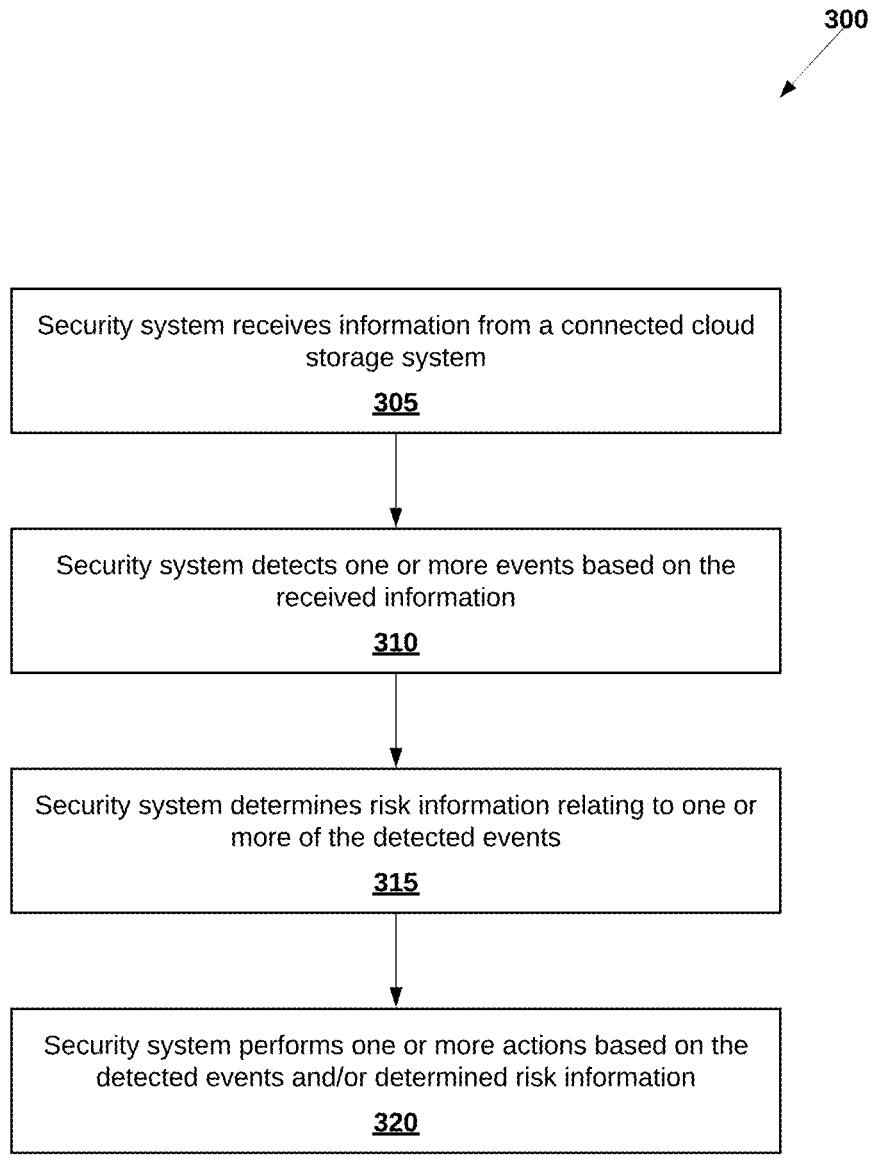
FIG. 3 shows an exemplary method 300 of monitoring a cloud storage system according to an embodiment.

Referring to FIG. 3, an exemplary method 300 of monitoring and protecting a cloud storage system is illustrated. As shown, a security system may be placed in communication with a cloud storage system such that it may transmit/receive information to/from the cloud storage system 305.

Generally, the security system may comprise a security application that is adapted to monitor one or more cloud storage systems (e.g., via an API). In one embodiment, a user may connect the security application to a cloud storage system at the user level. In this case, the security application may receive user information relating to a user of the cloud storage system, application information relating to one or more cloud applications connected to the cloud storage system and file information relating to any number of files stored in the cloud storage system.

In another embodiment, a security application may be placed in communication with a cloud software suite that is associated with a cloud storage system and any number of additional first-party cloud applications and/or third-party cloud applications. In this case, the security application may be connected to the cloud software suite at the user level and/or at the domain level, such that the security application may receive user information relating to one or more users of the cloud software suite, application information relating to one or more cloud applications associated with (or connected to) the software suite, and file information relating to any number of files stored in a cloud storage system associated with the software suite.

At step 310, the security application may detect one or more events based on the information received from the cloud storage system (and, optionally, any cloud applications connected to the cloud storage system). As discussed above, each event may be associated with a number of components, including: an activity relating to a target system (i.e., the cloud storage system), one or more target files stored in the cloud storage system, a source (e.g., a user or cloud application), a source location, and an event time. Accordingly, the security system may determine and record event information relating to each of these components.

At step 315, the security system may determine risk information relating to one or more of the detected events. As the system receives event information, the system may quantify the risk (i.e., by calculating a risk score) associated with such information. To that end, the system may comprise a risk engine that employs one or more risk models to determine risk score calculations. The risk engine may be built on an infrastructure that allows users to select and/or define risk rules and parameters included in the risk models.

Exemplary risk models may be based on any number of risk parameters, such as but not limited to: activity type, activity patterns, target file sensitivity information and/or encryption status; source application information or source user information (e.g., permission information and/or security information); source location information (e.g., the specific location(s) and/or number of different locations from which files are accessed); and/or time information. It will be appreciated that risk models may employ static parameters (e.g., weights) and/or dynamic parameters (e.g., frequency of use, type of access, etc.). It will be further appreciate that each of the above parameters may be manually entered into the system, received from a connected data source and/or may be automatically determined by the system.

As an example, the system may track file access of various cloud applications and/or how such files are used in order to calculate a risk score for each file. The file risk score may be calculated based on one or more of the following factors: the number of times the file is accessed, the applications and/or users accessing the file, the last time the file was accessed, the frequency of file access, file content, file encryption status and/or types of activities taken with respect to the file.

As another example, a risk score may be determined for each source (e.g., application and/or user), based on the source's permissions information and/or security information. Such information may be manually input by a user, automatically determined by the system, and/or received from one or more connected data sources.

In certain embodiments, the system may calculate an aggregate risk score for a given event (i.e., an event risk score) based on the risk scores of the event's individual components. For example, each individual risk score may be weighted and then summed to arrive at the event risk score.

Generally, each calculated risk score may be employed to characterize, tag or otherwise classify events and event components based on risk rules. For example, the system may classify a file as "low risk" if the file's risk score is below a first threshold. As another example, the system may classify a file as "infected" if the file's risk score is above a second threshold. And as another example, the system may classify an event as "high risk" or "ransomware attack" if the event's risk score is above a certain predefined threshold.

In one embodiment, the system may be preconfigured with a number of risk rules. In another embodiments, the system may be adapted to allow users to manually create and/or update risk rules.

In certain embodiments, the system may be configured to automatically update existing risk rules and/or determine new risk rules. For example, the system may employ machine learning techniques to iteratively and/or continuously update risk rules. One or more of the following machine learning algorithms may be employed: clustering, logistic regression, decision tree learning, Bayesian networks, random forests, support vector machine ("SVM") and/or artificial neural networks.

It will be appreciated that various machine learning algorithms provide different results for different types of information. Moreover, the type and/or amount of stored information may vary widely among users. Accordingly, the system may employ a semi-supervised active learning process, where training data is used to train and validate a plurality of algorithms to select the most effective for classifying events and event components.

In addition to determining risk scores and/or classifications for each event, the system may determine such information across multiple events. For example, the system may determine a frequency of events relating to particular activities and, optionally, particular files stored in a cloud storage system. The system may then determine a risk score for the monitored events and classify the events based one or more risk rules. In one particular embodiment, the system collects log records of file change events and builds sequences between them. Each sequence may be compared with patterns and one or more thresholds may be determined or calculated for each sequence.

At optional step 320, the security system performs one or more actions. The security system may be adapted to perform various actions upon determining that an event has occurred and/or that a certain classification of event has occurred. For example, the system may display or transmit notifications to one or more users (e.g., based on notification preferences). As another example, the security system may prevent one or more users and/or cloud applications from accessing a cloud storage system. And, as yet another example, the application may automatically restore infected files to a previous, non-infected version (e.g., from a backup of such files) when an event is classified as a ransomware attack.

Figure 4:
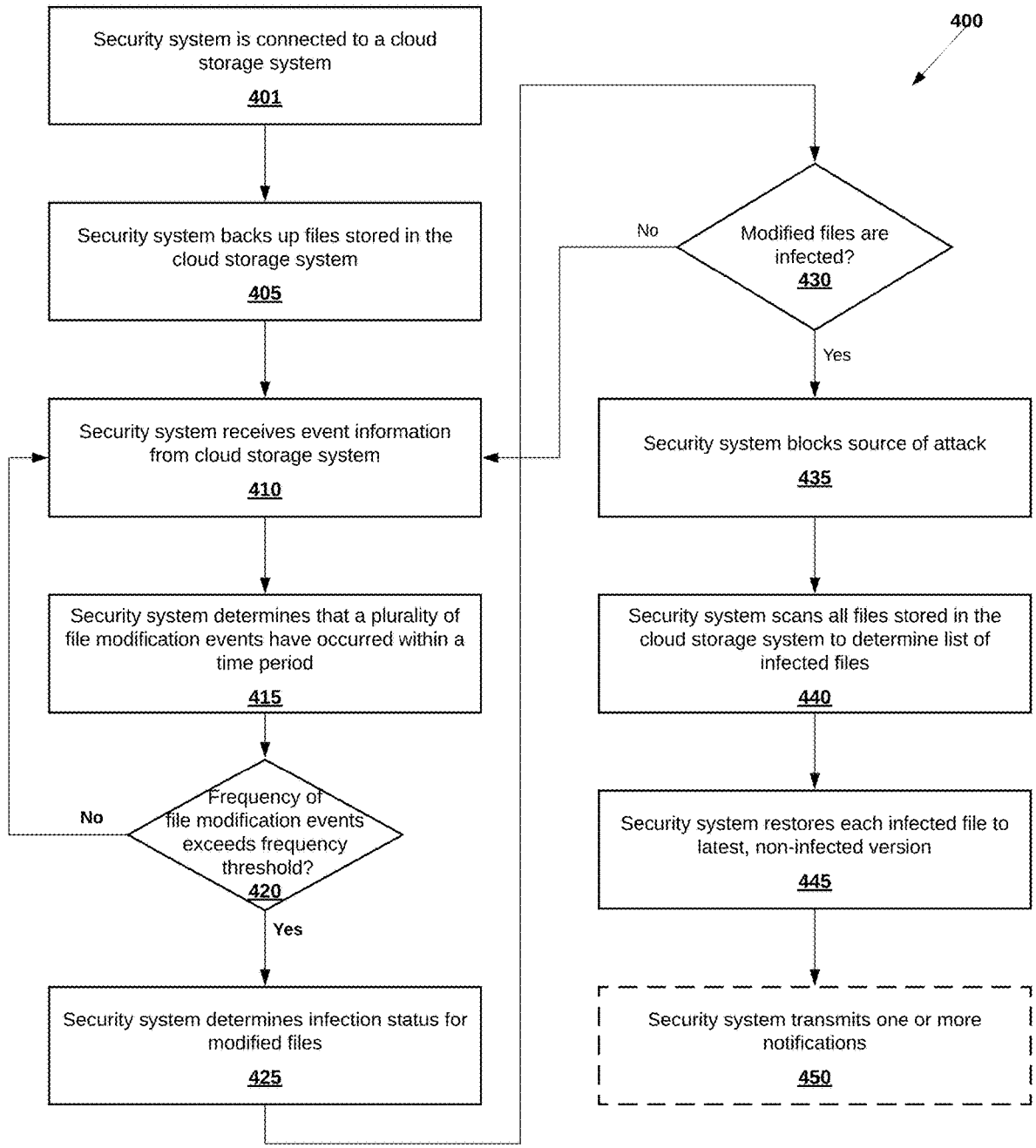
FIG. 4 shows an exemplary ransomware detection and recovery method 400 according to an embodiment.

Referring to FIG. 4, an exemplary method 400 of detecting a ransomware attack event and recovering infected files according to an embodiment is illustrated. As shown, a security system may be placed in communication with a cloud storage system such that it may transmit/receive information to/from the cloud storage system 401.

At step 405, the security system may create and store a backup comprising some or all of the files stored in the cloud storage system and associated with a particular user. Such backups may be automatically generated by the system according to predetermined time intervals. Additionally or alternatively, the security application may allow a user to manually generate backups of one or more of the files as desired or required.

In certain embodiments, the security system may create a backup comprising some of the user's data with version control, such that a user may restore data for a specific period of time. All backed-up data may be stored on a secure and independent cloud storage system.

At step 410, the system receives event information, such as activities relating one or more files stored in the cloud storage system, file information relating to such files, source information relating to users and/or or cloud applications, location information relating to sources, and/or times when events occur. As the system receives the event information, the system may quantify the risk (i.e., by calculating a risk score) associated with such information.

At step 415, the system detects the start of a ransomware attack event. Specifically, the system determines that a certain number of file modification events have occurred within a given time period. And at step 420, the system determines whether the frequency (or intensity) of such modification events matches a predetermined pattern and/or exceeds a predetermined threshold (e.g., as specified by a given risk rule). If so, the system continues to step 425. If not, the system may return to step 410, where it continues monitoring the cloud storage system.

Generally, ransomware applications may modify file information for a large number of files stored on a local user device. For example, ransomware applications may encrypt files or otherwise modify file content, cause changes to file metadata, rename files, modify file extensions, move files to different locations, and/or cause other changes. Such file modifications will cause a syncing application installed on the local computer to automatically (and quickly) sync the modified, infected files to a cloud storage system. Accordingly, a large number of file modification events occurring within a short amount of time may indicate that a ransomware attack is in progress.

In one particular embodiment, the system may focus on file rename events, as most known ransomware attacks rename files and such events may be detected quickly. However, it will be appreciated that the security system may analyze any type of file modification event and/or combinations of such events to detect activities of known or unknown types of ransomware.

At step 425 the security system determines an infection status for some or all of the modified files. At step 430, if the modified files are not determined to be infected, the system returns to step 410, to continue monitoring the cloud storage system. However, if the modified files are determined to be infected, the system continues to step 435.

Generally, the system may determine infection status based on any file information associated with a file. In one embodiment, the system may determine infection status based on, for example, whether or not a file: is encrypted, contains malicious code replication, has been overwritten, and/or has been moved to a non-typical location. In another embodiment, the system may determine infection status by comparing a file's content to that of a previous backed-up version of the file. In yet another embodiment, the system may determine infection status by comparing a file's metadata to that of a previous backed-up version of the file.

At step 435, the system blocks the source of the detected ransomware attack. In one embodiment, the system may determine the source application (e.g., by application ID) and/or a user (e.g., a user account) associated with the file modification events. The application may then revoke the source's access rights to the cloud storage system (e.g., through an API or the like) to stop the ransomware application from infecting additional files in the cloud storage system. The system may additionally revoke access to a synchronization application responsible for synchronizing infected files to the cloud storage system.

At step 440, the system may scan all files stored in the cloud storage system to determine whether any additional infected files exist. The system may determine an infection status of each file as discussed above, and the system may create and return a list of all infected files.

At step 445, the system recovers all files determined to be infected. In one embodiment, the system may restore infected files to a most-recent, non-infected backup version. In other embodiments, the system may restore files to one or more previous versions specifically identified by a user.

In one embodiment, recovery may employ a version control system, such as the RESTORE-IN-TIME MACHINE system provided by Spinbackup Inc. The version control system may collect "snapshots" of some or all files stored in a cloud storage system. Such snapshots may be automatically created at predetermined time intervals (e.g., hourly, daily, monthly, etc.) or may be manually created by a user. Accordingly, the latest snapshot before a ransomware attack may be restored with the same folder hierarchy.

Finally, at optional step 450, the security system may transmit one or more notifications relating to the ransomware attack and file restoration. In one embodiment the system may transmit a notification to a user whose files were infected and/or restored. The notification may include details of the detected attack and/or restoration. For example, the notification may include information relating to a source of the attack, users notified by the system, a time when the attack was detected, a number of infected files, a number of restored files, and/or a backup version to which the infected files were restored.

Figure 5:
FIG. 5 shows an exemplary events list screen 500 of a security application according to an embodiment.

Referring to FIG. 5, an exemplary events list screen 500 of a security application according to an embodiment is illustrated. As shown, this screen displays an events list 510 comprising event information relating to any number of events detected by the system.

In one embodiment, the displayed event information may include an activity 535 associated with the event, a source 530 (i.e., a user or cloud application), a target system 540, a time the event occurred 520, and any determined risk information 525 (e.g., a risk score or risk classification). Although the illustrated events list 510 is shown to include specific event information, it will be appreciated that, in other embodiments, additional or alternative event information may be displayed.

In one embodiment, the events list 510 may be sortable and/or filterable by event time. For example, a drop-down menu 515 may be displayed to allow a user to choose a date. Upon selection of date, the events list 510 may be dynamically filtered to display only events associated with the selected date (or date range).

In one embodiment, the events list 510 may be sortable and/or filterable by activity type (e.g., via a drop-down menu 550). As shown, exemplary activity types may include, but are not limited to: connecting a cloud application to a cloud storage system 568, disconnecting a cloud application from a cloud storage system 569, abnormal download/transfer of a file stored on a cloud storage system 570, sharing a non-sensitive file stored on a cloud storage system 571, any activity relating to a file containing sensitive information 572 (e.g., credit card information), moving a file to the trash bin of a cloud storage system 573, deleting a file from a cloud storage system 574, signing into a cloud storage system 575, abnormal logins to cloud storage system 576, ransomware protection 577, and signing out of a cloud storage system 578. In other embodiments, additional or alternative activities may include modifications (e.g., of files, privileges, etc.), abnormal modifications (e.g., modifications from a different geographic area, IP address, network, etc. than expected), newly created items, etc.

In one embodiment, the events list 510 may be sortable and/or filterable by risk classification 525 (e.g., via a drop-down menu 580). As shown, exemplary risk classifications may include, from lowest risk to highest risk: information events 581, low-risk events 582, medium-risk events 583 and/or high-risk events 584.

Generally, an event may be classified as an information event when its aggregate risk score is determined to be from about 0 to less than a first risk threshold. Such events are generally considered to be extremely low risk as they typically relate to low-risk activities performed on a non-sensitive files by a trusted source. These events may also be received from a known location (i.e., a location associated with the source) and/or may occur at a frequency that is well below a frequency threshold. In preferred embodiments, the security application will display information events in the events list 510, but will not transmit notifications to users based on such events.

An event may be classified as a low-risk event when its aggregate risk score is determined to be greater than or equal to the first threshold and less than a second threshold. Such events are similar to information events, except they typically relate to higher-risk activities (e.g., installations of cloud applications, file renames, file modifications, file deletions, file privilege changes, etc.).

An event may be classified as a medium-risk event when its aggregate risk score is determined to be greater than or equal to the second threshold and less than a third threshold. Such events may be associated with higher-risk activities that are performed by a trusted source on one or more sensitive files. In certain embodiments, medium risk events may be associated with an unknown location and/or may occur at a frequency that is around or slightly above a frequency threshold.

Finally, an event may be classified as a high-risk event when its aggregate risk score is determined to be greater than or equal to the third threshold. Such events will typically require review and/or intervention by a user or the system, as they relate to one or more of: a high-risk activity, a sensitive file, a high-risk source application, an unknown location, and a frequency that is above a frequency threshold. In preferred embodiments, the system will notify users of any high-risk events. Moreover, as discussed in detail above, the system may automatically take any number of actions (e.g., blocking a source, checking for infected files, recovering infected files, etc.) upon determining that a high-risk event has occurred.

In certain embodiments, a user may select a listed event to view additional event information relating thereto. For example, a user may view some or all of the following information for a selected event: location information (e.g., an associated network, a geographic area, an IP address, a user device ID), source information (e.g., account ID), activity details (e.g., invalid password received), target system information, a last-scan time, risk scores, and/or any factors used to determine such score. The additional event information may be displayed via a separate webpage, a tooltip, a modal, and/or an information panel. Alternatively, any of such information may be included in the events list 510.

Figure 6:
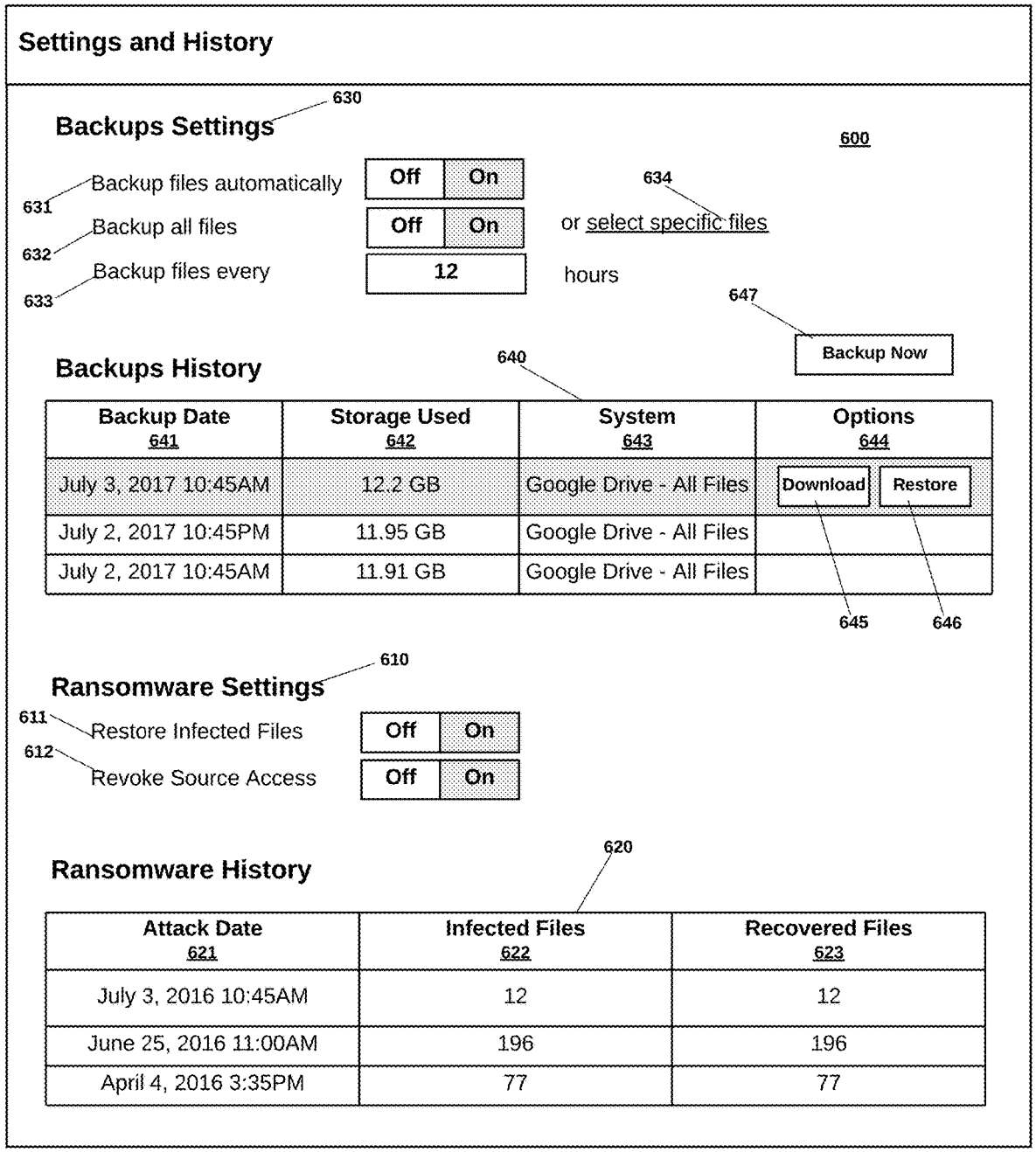
FIG. 6 shows an exemplary settings and history screen 600 of a security application according to an embodiment.

Referring to FIG. 6, an exemplary settings and history screen 600 of a security application is illustrated. As shown, this screen 600 may display various information relating to cloud storage system backups and/or ransomware attacks.

In one embodiment, the settings and history screen 600 may provide a number of user-configurable settings 610 relating to actions that may be automatically taken by the system upon detecting a ransomware attack. For example, the displayed ransomware settings 610 may comprise an option to allow the security system to automatically restore infected files 611 and/or an option to allow the security system to automatically revoke source access to the cloud storage system 612.

The settings and history screen 600 may also display a list 620 of current and/or historical ransomware attacks associated with the cloud storage system. As shown, the list 620 may comprise some or all of the following information for each ransomware attack: a time that the ransomware attack was detected 621, a number of files infected by the attack 622, and a number of infected files that were recovered by the system 623.

In one embodiment, a user may select one of the displayed ransomware attacks to view additional details about the attack and/or an associated file recovery performed by the system. Such additional information may include, but is not limited to, file information relating to infected and/or recovered files, notification information relating to transmitted notifications, user information and/or application information relating to a source of the attack, and/or any event information relating to the attack.

The settings and history screen 600 may also provide a number of user-configurable settings 630 relating to automatic backups of the cloud storage system. For example, the displayed backup settings 630 may comprise an option to allow the security system to automatically backup the cloud storage system 631, an option to automatically backup all files in the cloud storage system 632 or to backup only specific files 634, and/or an option to set or adjust the frequency of such backups 633.

Upon turning on the option for automatic backups 631, the system may automatically create backups of some or all of the files stored in a cloud storage system (e.g., according to the files selected via the corresponding options 632, 634) at predetermined time intervals (e.g., according to the time interval selected via the corresponding option 633). As such, the system may generate multiple, incremental backups of the same data, including metadata-tagged versioning and snapshots by the date created to allow the user to quickly identify the files, have multiple versions of backups to choose to restore from, and restore infected files with minimal disruption to workflows. The backups may be securely stored and encrypted on the cloud storage system or, preferably, on a different cloud storage system, and may be searchable.

In certain embodiments, a list 640 of the cloud storage system backups may be presented to the user. As shown, the list 640 may comprise some or all of the following information for each backup: a time that the backup was created 641, an amount of storage used by the backup 642, and the cloud storage system and/or files that were backed up 643.

A user may select one of the displayed backups to view additional options 644 relating to the selected backup. For example, upon selecting a backup, the system may display an option to download 645 a compressed copy of the selected backup and/or an option to restore 646 some or all files stored in the cloud storage system to a previous version associated with the selected backup. Additionally or alternatively, the system may display an option 647 to allow a user to manually create a backup of some or all files stored in the cloud storage system.

Figure 7:
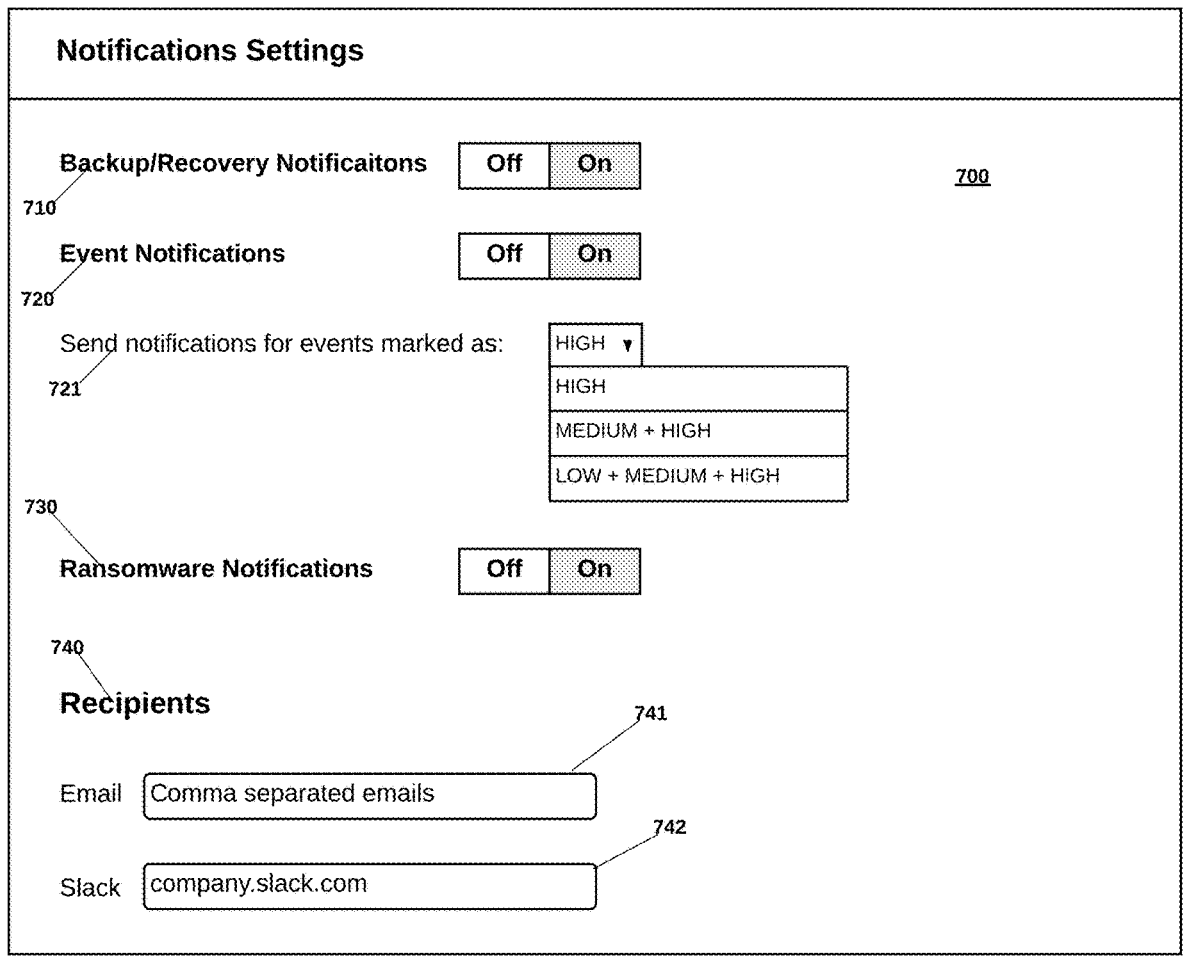
FIG. 7 shows an exemplary notifications settings screen 700 of a security application according to an embodiment.

Referring to FIG. 7, an exemplary notifications settings screen 700 of a security application is illustrated. Generally, this screen allows a user to specify whether the system should send various notifications, conditions upon which such notifications should be sent, and where such notifications should be sent. It will be appreciated that the security system may generate and transmit many types of notifications, such as those comprising visual alerts (e.g., text, still or animated images, videos, etc.), sounds (e.g., a chime, a ring, etc.) and/or a haptic alerts (e.g., a vibration).

In one embodiment, the notifications settings screen 700 allows the user to turn on/off notifications relating to backups 710, events 720, and/or ransomware attacks 730. The screen may also display an option 721 to allow the user to specify which categories of events should trigger a notification. For example, the user may specify that the system should send event notifications for low-risk and higher events, for medium-risk and higher events, or for only events categorized as high-risk.

It will be appreciated that the system may allow a user to receive and/or customize event notifications based on any event information. For example, in certain embodiments a user may turn on/off notifications relating to: events having an "information" classification; events associated with specific activities; events that occur on, before, or after a certain date; events within a specified time range; events associated with one or more particular sources or locations; events relating to particular target systems or target files and/or others.

As shown, the user may specify one or more recipients 740 to receive the various notifications. In one embodiment, any number of recipients may be specified via email address 741 and/or messaging account 742 (e.g., phone number, WHATSAPP, GROUPME, SLACK, FACEBOOK, INSTAGRAM, TWITTER, GOOGLE, WECHAT, etc.).

Referring to FIG. 8, an exemplary cloud applications audit screen 800 of a security application is illustrated. As discussed above, the security system may monitor cloud applications that access one or more connected cloud storage systems. Generally, the system may determine application information for such cloud applications at any number of times 805 and may display some or all of the determined application information 810 via the cloud application audit screen 800. For example, this screen may display a total number of connected cloud applications 840.

In certain embodiments, the security system may determine a risk score and/or risk classification for each of the connected cloud applications. For example, the system may calculate a risk score for a given cloud application based on any received or determined application information associated therewith (e.g., permissions information, security information and/or any associated events).

The system may then determine a risk classification for the cloud application by comparing the calculated risk score to a predetermined risk threshold. For example, the system may determine whether a given application should be classified as "trusted" (i.e., low risk) or "risky" (i.e., high risk) depending on whether the calculated risk score is above or below a certain risk threshold.

As shown, the system may display any information relating to cloud application risk scores and/or risk classifications. In one embodiment, the system may display the total number of connected cloud applications that have been classified as "trusted" 820 and/or the total number of connected cloud applications that have been classified as "risky" 830. In other embodiments, the system may additionally or alternatively display information relating to: data that may be accessed by one or more cloud applications, a risk score calculated for one or more cloud applications and/or a risk scores distribution for any number of connected cloud applications.

It will be appreciated that the security system may automatically scan connected cloud applications at predetermined time intervals that may be set and modified by the system or a user. Alternatively or additionally, the security system may allow a user to manually start a cloud application scan (e.g., via a "scan now" option 815).

Various embodiments are described in this specification with reference to the above detailed description, the accompanying drawings, and the claims. Numerous specific details are described to provide a thorough understanding of various embodiments. However, in certain instances, well-known or conventional details are not described in order to provide a concise discussion. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the embodiments.

The embodiments described and claimed herein and drawings are illustrative and are not to be construed as limiting the embodiments. The subject matter of this specification is not to be limited in scope by the specific examples, as these examples are intended as illustrations of several aspects of the embodiments. Any equivalent examples are intended to be within the scope of the specification. Indeed, various modifications of the disclosed embodiments in addition to those shown and described herein will become apparent to those skilled in the art, and such modifications are also intended to fall within the scope of the appended claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

All references including patents, patent applications and publications cited herein are incorporated herein by reference in their entirety and for all purposes to the same extent as if each individual publication or patent or patent application was specifically and individually indicated to be incorporated by reference in its entirety for all purposes.

What is claimed is:

1. A method of providing ransomware protection for a cloud security system comprising:
   receiving, by a security system, during a first time period, file information for each of a plurality of files stored in a cloud storage system;
   generating and storing, by the security system, during the first time period, a backup file corresponding to each of the plurality of files stored in the cloud storage system;
   receiving, by the security system, during a second time period, modified file information for each of a subset of files selected from the plurality of files stored in the cloud storage system;
   determining, by the security system, based on the received modified file information, that a plurality of events have occurred during the second time period,
      wherein each of the plurality of events is associated with event information comprising:
         a modified file selected from the subset of files;
         a file modification activity performed on the modified file;
         a time the file modification activity was performed; and
         a source of the file modification activity;
   determining by the security system, an individual event risk score for each of the events;
   calculating, by the security system, an aggregate risk score for the plurality of events based on the individual event risk scores;
   classifying, by the security system, the plurality of events as a ransomware attack, based on the aggregate risk score; and
   performing, by the security system, an action based on said classifying.

2. The method according to claim 1, wherein the action comprises blocking the source of the file modification activity associated with the event information of a given event.

3. The method according to claim 1, wherein the action comprises replacing, in the cloud storage system, one or more of the modified files in the subset of files with the corresponding stored backup file.

4. The method according to claim 1, wherein the action comprises transmitting, by the security system, one or more notifications to one or more users.

5. The method according to claim 1, wherein the action comprises:
- scanning, by the security system, each of the plurality of files stored in the cloud storage system;
- determining, by the security system, one or more of the scanned files is an infected file; and
- transmitting, by the security system, to a user device, a notification comprising information relating to the infected file.

6. The method according to claim 1, wherein the file modification activity comprises one or more of: renaming the modified file, encrypting the modified file, editing contents of the modified file, editing metadata of the modified file, moving the modified file, deleting the modified file, and sharing the modified file.

7. The method according to claim 6, wherein the file modification activity comprises renaming the modified file.

8. The method according to claim 1, wherein the received file information for each of the plurality of files stored in the cloud storage system comprises one or more of: a file name, a file type, file metadata, file contents, a file location, a file encryption status and file sensitivity information.

\* \* \* \* \*